(12) United States Patent
Lee et al.

(10) Patent No.: US 11,698,572 B2
(45) Date of Patent: Jul. 11, 2023

(54) DEVICE FOR CONTROLLING MULTI-AXIAL TILT OF CAMERA LENS AND METHOD THEREFOR

(71) Applicant: DONGWOON ANATECH CO., LTD., Seoul (KR)

(72) Inventors: Da Woon Lee, Seongnam-si (KR); Young Ho Lee, Hanam-si (KR); Noh Yeol Park, Seoul (KR)

(73) Assignee: DONGWOON ANATECH CO., LTD., Seoul (KR)

( * ) Notice: Subject to any disclaimer, the term of this patent is extended or adjusted under 35 U.S.C. 154(b) by 0 days.

(21) Appl. No.: 17/630,223

(22) PCT Filed: Dec. 8, 2020

(86) PCT No.: PCT/KR2020/017865
§ 371 (c)(1),
(2) Date: Jan. 26, 2022

(87) PCT Pub. No.: WO2021/118204
PCT Pub. Date: Jun. 17, 2021

(65) Prior Publication Data
US 2022/0283480 A1 Sep. 8, 2022

(30) Foreign Application Priority Data
Dec. 12, 2019 (KR) .......................... 10-2019-0165452

(51) Int. Cl.
*G03B 17/12* (2021.01)
*G03B 5/02* (2021.01)
*G03B 13/36* (2021.01)

(52) U.S. Cl.
CPC ............... *G03B 17/12* (2013.01); *G03B 5/02* (2013.01); *G03B 13/36* (2013.01)

(58) Field of Classification Search
CPC .......... G03B 17/12; G03B 5/02; G03B 13/36
See application file for complete search history.

(56) References Cited

U.S. PATENT DOCUMENTS

| 8,482,621 | B2 | 7/2013 | Nagata et al. ........... 348/208.99 |
| 2019/0129132 | A1 | 5/2019 | Fan et al. ................. G02B 7/10 |
| 2020/0012168 | A1* | 1/2020 | Kim ......................... G03B 5/02 |

FOREIGN PATENT DOCUMENTS

| JP | 2009-145635 A | 7/2009 |
| JP | 5857322 B2 | 2/2016 |
| JP | 6052315 B2 | 12/2016 |
| KR | 10-2007-0043103 A | 4/2007 |
| KR | 10-2015-0050080 A | 5/2015 |
| KR | 10-2016-0060219 A | 5/2016 |
| KR | 10-2016-0139523 A | 12/2016 |
| KR | 10-2018-0022316 A | 3/2018 |

* cited by examiner

*Primary Examiner* — Minh Q Phan
(74) *Attorney, Agent, or Firm* — Stein IP, LLC

(57) ABSTRACT

The present invention relates to a device for controlling a multi-axial point tilt of a camera lens and a method therefor, characterized by controlling a camera lens to move within a common stroke section among respective stroke sections in which the camera lens can move in an axis direction (z-axis) parallel to an optical axis direction at each of three or more axial points, wherein the camera lens is moved to a target position by using a compensation factor that is compensated such that a lens movement distance for each control code is the same.

8 Claims, 7 Drawing Sheets

(a)

(b)

DEVICE FOR CONTROLLING MULTI-AXIAL TILT OF CAMERA LENS AND METHOD THEREFOR

CROSS-REFERENCE TO RELATED APPLICATIONS

This application is a national stage of International Application No. PCT/KR2020/017865, filed Dec. 8, 2020, which claims the benefit of Korean Application No. 10-2019-0165452, filed Dec. 12, 2019, in the Korean Intellectual Property Office, the disclosure of which is incorporated herein by reference.

TECHNICAL FIELD

The present invention relates to a camera control system, and more particularly to a device for controlling the tilting of a multi-axial point of a camera lens and a method therefor

BACKGROUND ART

Camera modules are being installed in most portable IT devices, including mobile phones and tablet PCs, as they become possible to realize high-function and high-pixel while being miniaturized. Misalignment (shift) between the center line of the lens group and the center line of the image sensor in the camera module is referred to as tilt. Since the camera module is manufactured by assembling various parts, tilt may occur due to the tolerance of each part itself and the assembly tolerance when assembling each part.

When tilt occurs above a certain level, the resolution of the photographed image is lowered, which ultimately lowers the quality of the image, so a technology for compensating tilt is required. As a tilt compensation technology, there is "Camera module and method for compensating tilt thereof" disclosed in Korean Patent Application Publication No. 10-2015-0050080.

In the example "Camera module and method for compensating tilt thereof", tilt is compensated in a way that the tilt of the lens unit is adjusted by connecting one side of the suspension to both sides of the lens unit so that the central axis of the lens unit coincides with the central axis of the image sensor.

As another prior art, there is an "Angle-adjustable camera module" disclosed in Korean Patent Application Laid-Open No. 10-2007-0043103. Such 'Angle-adjustable camera module' also compensates for the tilt, as illustrated in FIG. 1, when the adjusting shafts 42 and 52 are floating in an up and down direction, respectively, and as a result, a floating plate 20 is tilted so that the angle of the lens assembly 10 is to be adjusted.

The above-described prior art uses two actuators to adjust the tilt (angle) of the camera lens. In order to adjust tilting of a planar surface, it is sufficient to adjust the height of two different points. However, only by adjusting the height of two points, only the tilting of the planar surface can be adjusted, and since the height of the entire plane cannot be adjusted, there is a limitation that the autofocus function cannot be implemented together.

PRIOR ART LITERATURE

Patent Literature (Patent Literature 1) Korean Patent Application Publication No. 10-2015-0050080 (Patent Literature 2) Korean Patent Application Publication No. 10-2007-0043103

DETAILED DESCRIPTION OF THE INVENTION

Technical Solution

Accordingly, the present invention is an invention devised to solve the above problems, and the main object of the present invention is to provide a device for controlling multi-axial tilt of a camera lens and a method therefor not only capable of adjusting the angle of the camera lens in multiple directions by adjusting the tilt (angle) of the camera lens at an multi-axial point, but also capable of implementing even autofocus function, and further, another object of the present invention is to provide a device for controlling the tilting of a multi-axial point of a camera lens and a method therefor, in which errors due to the parts and assembly are compensated, by moving a camera lens to be moved for implementing autofocus in the same direction at a multi-axial point in a way that the amount of movement of the lens moving in the same direction at the multi-axial point is to be the same.

In addition, another object of the present invention is provide a stroke calculation method capable of calculating the lens stroke at each axial point required to control the camera lens so that the amount of movement of the lens moving in the same direction at a multi-axial point is to be the same, by using only one measuring instrument.

Technical Solution

A camera lens multi-axial tilt control device according to an embodiment of the present invention for achieving the above object comprises:

Hall sensors for detecting a current position of a camera lens movable in an axial direction parallel to an optical axis direction (z axis) at three or more points spaced apart a same distance from the center of the optical axis direction (z axis) of the camera lens, respectively;

servo control units corresponding to each of the Hall sensors and outputting a servo control signal for moving the camera lens to the target position by comparing the current position of the camera lens being detected by the corresponding Hall sensor with the target position; and actuator driving units corresponding to each of the servo control unit and moving the camera lens to the target position in an axial direction parallel to the optical axis direction at any one of the three or more points according to the servo control signal being outputted from the corresponding servo control unit, characterized in that each of the servo control units controls the movement of the camera lens within a common stroke section among each stroke section in which the camera lens can move in an axial direction (z-axis) parallel to the optical axis direction at each of the three or more points, wherein the camera lens is being moved to a target position using a compensation factor compensated so that the lens movement distance per control code is the same.

A camera lens multi-axial tilt control device according to another embodiment of the present invention comprises:

a circular floating plate on which the camera lens assembly is mounted;

a magnet mounted on the floating plate and mounted at three or more axial points spaced apart a same distance from the center of the optical axis direction (z-axis) of the camera lens;

an actuator located at a lower portion of each of the magnets;

Hall sensors facing each of the magnets and detecting a current position of a camera lens movable in an axial direction (z-axis) parallel to the optical axis direction at each axial point;

servo control units corresponding to each of the Hall sensors and outputting a servo control signal for moving the camera lens to the target position by comparing the current position of the camera lens being detected by the corresponding Hall sensor with the target position; and actuator driving units corresponding to each of the servo control units and moving the camera lens to a target position in an axial direction parallel to the optical axis direction at each axial point according to a servo control signal being outputted from the corresponding servo control unit, characterized in that each of the servo control units controls the movement of the camera lens within a common stroke section among each stroke section in which the camera lens can move in an axial direction (z-axis) parallel to the optical axis direction at each of the three or more points, wherein the camera lens is moved to a target position using a compensation factor compensated in a way that the lens movement distance per control code is the same.

Furthermore, the camera lens multi-axial tilt control method according to another embodiment of the present invention includes a method executable in a servo control unit comprising the steps of:

receiving the current position of the camera lens from a Hall sensor that detects the current position of a camera lens movable in the axial direction (z-axis) parallel to the optical axis direction at each of three or more points spaced apart a same distance from the center of the optical axis direction (z-axis) of the camera lens; and outputting each of the plurality of servo control signals for moving the camera lens to each target position in the axial direction parallel to the optical axis direction by comparing the current position of the camera lens detected at each of the three or more points with the target position, to different actuator driving units, characterized in that each of the plurality of servo control signals is a signal for moving the camera lens within a common stroke section among each stroke section in which the camera lens can move in an axial direction (z-axis) parallel to the optical axis direction at each of the three or more points, and being generated by using a compensation factor compensated so that the lens movement distance per control code is the same.

Advantageous Effects

According to means for solving the above technical problems, there is an advantage in that the present invention is not only capable of adjusting the angle of the camera lens in multiple directions by individually controlling the tilt (angle) of the camera lens for each multi-axial point of the camera lens, but also capable of implementing autofocus function by making the movement distance of the lens per control code to be the same for all axial points.

In addition, there are advantages in that since the present invention can tilt the camera lens by individually controlling the height of the multi-axial point of the camera lens, it is possible to control the roll and pitch angles of the lens as well as implement an anti-shake function.

BEST MODE OF THE INVENTION

Figure 1:
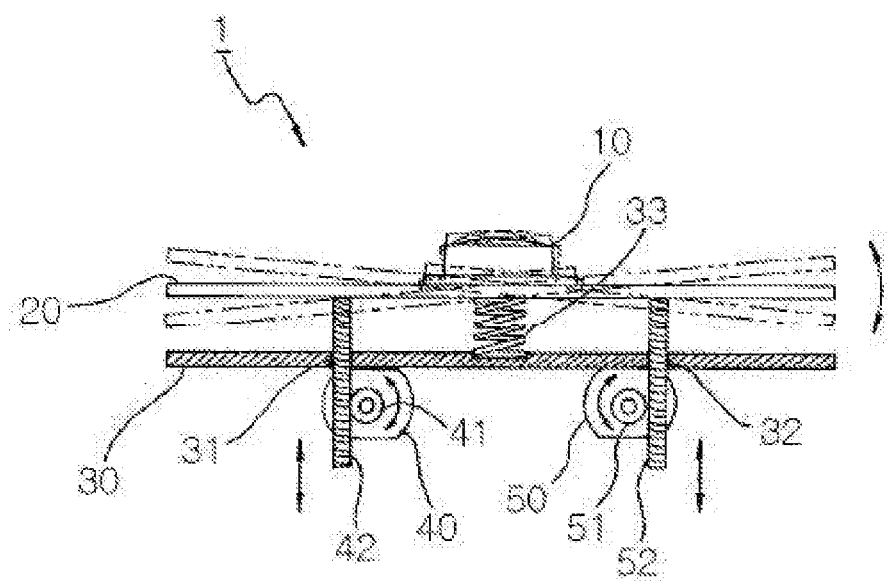
FIG. 1 is a cross-sectional view of an essential part of a publicly known camera module angle adjustment device.

The following detailed description of the present invention refers to the accompanying drawings, which show by way of illustration a specific embodiment in which the present invention may be practiced, in order to clarify the objects, technical solutions and advantages of the present invention. These embodiments are described in detail so as to be sufficient enough for those skilled in the art in implementing the present invention.

Also throughout this description and claims, the word 'comprise' and variations thereof are not intended to exclude other technical features, additions, components or steps. Other objects, advantages and characteristics of the present invention will become apparent to a person skilled in the art in part from this description and in part from practice of the present invention. The following illustrations and drawings are provided by way of illustration and are not intended to limit the invention. Moreover, the invention encompasses all possible combinations of the embodiments indicated herein. It should be understood that the various embodiments of the present invention are different but need not be mutually exclusive. Accordingly, the following detailed description is not intended to be taken in a limiting sense, and the scope of the present invention, if properly described, is limited only by the appended claims, along with all scope equivalent to those claimed. Similar reference numerals in the drawings refer to the same or similar functions throughout the various aspects.

In this specification, unless indicated otherwise or clearly contradicted by context, items referred to in the singular encompass the plural unless the context requires otherwise. In addition, in describing the present invention, if it is determined that a detailed description of a related known configuration or function may obscure the gist of the present invention, the detailed description thereof will be omitted.

Hereinafter, in order to enable those skilled in the art to easily practice the present invention, preferred embodiments of the present invention will be described in detail with reference to the accompanying drawings.

Figure 2:
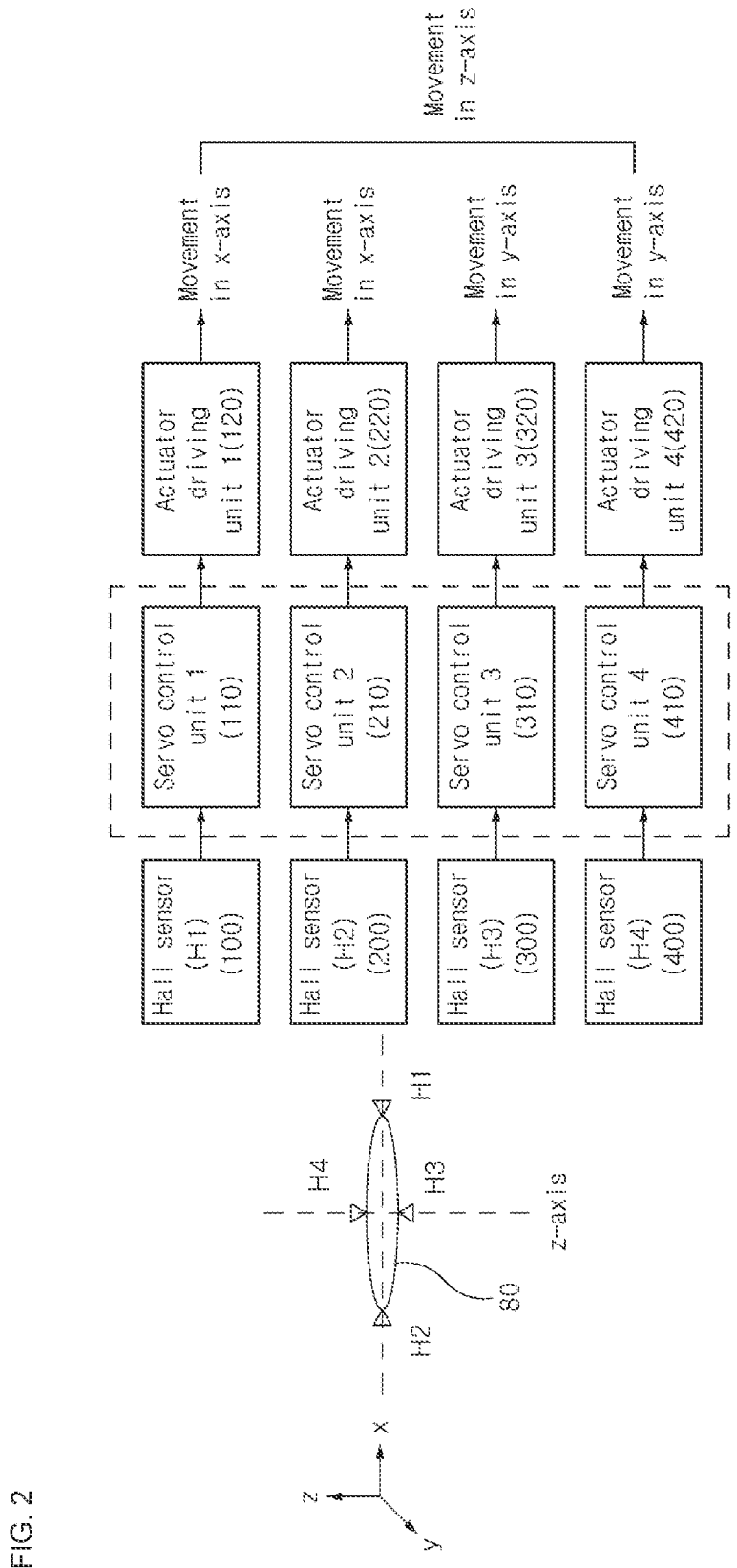
FIG. 2 is an exemplary block diagram of a camera lens multi-axial tilt control device according to an embodiment of the present invention.

First, FIG. 2 is an exemplary block diagram of a camera lens multi-axial tilt control device according to an embodiment of the present invention.

As illustrated in FIG. 1, a camera lens multi-axial tilt control device according to an embodiment of the present invention comprises:

Hall sensors H1, H2, H3, and H4 for detecting a current position of a camera lens 80 movable in an axial direction parallel to an optical axis direction (z axis) at three or more points spaced apart a same distance from the center of the optical axis direction (z axis) of the camera lens 80, respectively;

servo control units 110, 210, 310, and 410 corresponding to each of the Hall sensors H1 to H4 and outputting a servo control signal for moving the camera lens 80 to the target position by comparing the current position of the camera lens 80 being detected by the corresponding Hall sensors H1 to H4 with the target position; and actuator driving units 120, 220, 320, and 420 corresponding to each of the servo control units 110, 210, 310, and 410 and moving the camera lens 80 to the target position in an axial direction parallel to the optical axis direction at any one of the three or more points according to the servo control signal being outputted from the corresponding servo control units 110, 210, 310, and 410, characterized in that each of the servo control units 110, 210, 310, and 410 controls the movement of the camera lens 80 within a common stroke section among each stroke section in which the camera lens 80 can move in an axial direction (z-axis) parallel to the optical axis direction at each of the three or more points, wherein the camera lens 80 is being moved to a target position using a compensation factor compensated so that the lens movement distance per control code is the same.

For reference, it is preferable to configure with four Hall sensors H1 to H4, as illustrated; each of these Hall sensors H1 to H4 is located on two axes (x-axis and y-axis) orthogonal to the optical axis (z-axis) of the camera lens 80, and is located at the two axial points facing each other on one axis about the center of the optical axis. The Hall sensor of H1 to H4 is a sensor for detecting the position of the moving camera lens 80 and can be mounted on a fixed structure around the moving camera lens 80, and a magnet is installed in a place facing each Hall sensor. Such a magnet can be mounted on a structure being floated together with the camera lens 80. That is, as illustrated in FIG. 3, the four magnets 70 are also located on two axes orthogonal to an optical axis of the camera lens 80, and face each other about the center of the optical axis on one axis.

Figure 3:
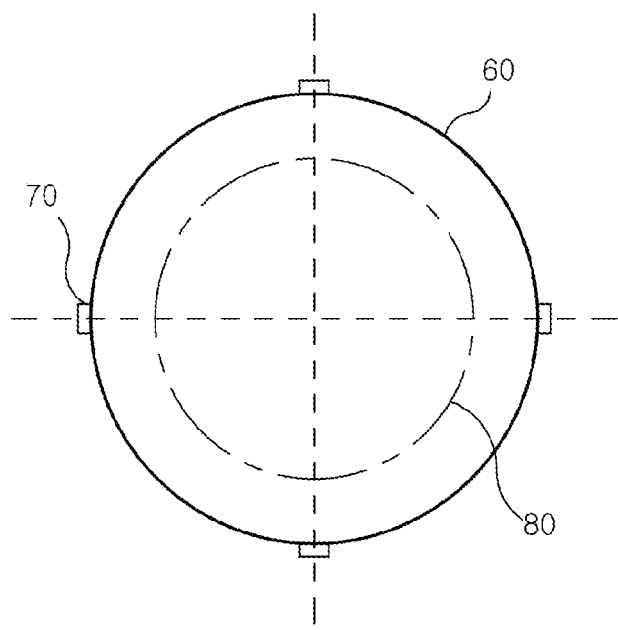
FIG. 3 is a view for explaining the mechanical arrangement of a camera lens multi-axial tilt control device according to an embodiment of the present invention.

For reference, FIG. 3 is a view for explaining the mechanical arrangement of a camera lens multi-axial tilt control device according to an embodiment of the present invention, and the assembly of the camera lens 80 is mounted on a circular floating plate 60 installed to be movable inside the camera module, and a magnet 70 is located at each dividing point (also an axial point) divided into four based on the center point of the floating plate 60. Since the Hall sensors H1 to H4 are located at a place facing each of the magnets 70, each of the Hall sensors H1 to H4 becomes possible to detect the position of the camera lens 80 moved in an axial direction (z-axis) parallel to an optical axis direction at the axial point where the magnet 70 is located according to the movement of the floating plate 60.

The floating plate 60 is raised or lowered by a current applied to an actuator (e.g., VCM) located at a lower portion of the each magnet 70, which will be described later. For reference, three or more axial points spaced apart the same distance from the center of an optical axis direction (z-axis) of the aforementioned camera lens 80 in an embodiment of the present invention is assumed that the magnet 70 and the Hall sensors H1 to H4 are located at four axial points.

Meanwhile, the servo control unit and actuator driving unit located in succession to one Hall sensor in the configuration of the present invention illustrated in FIG. 2 may be manufactured as a single chip driver IC, and all four servo control units 110, 210, 310, and 410 may also be manufactured as a single chip, thereby minimizing the number and size of parts. Hereinafter, in a camera lens multi-axial tilt control device having the above-described circuit configuration, the tilt of the camera lens is adjusted at a multi-axial point will be described in detail with reference to FIG. 4.

Figure 4:
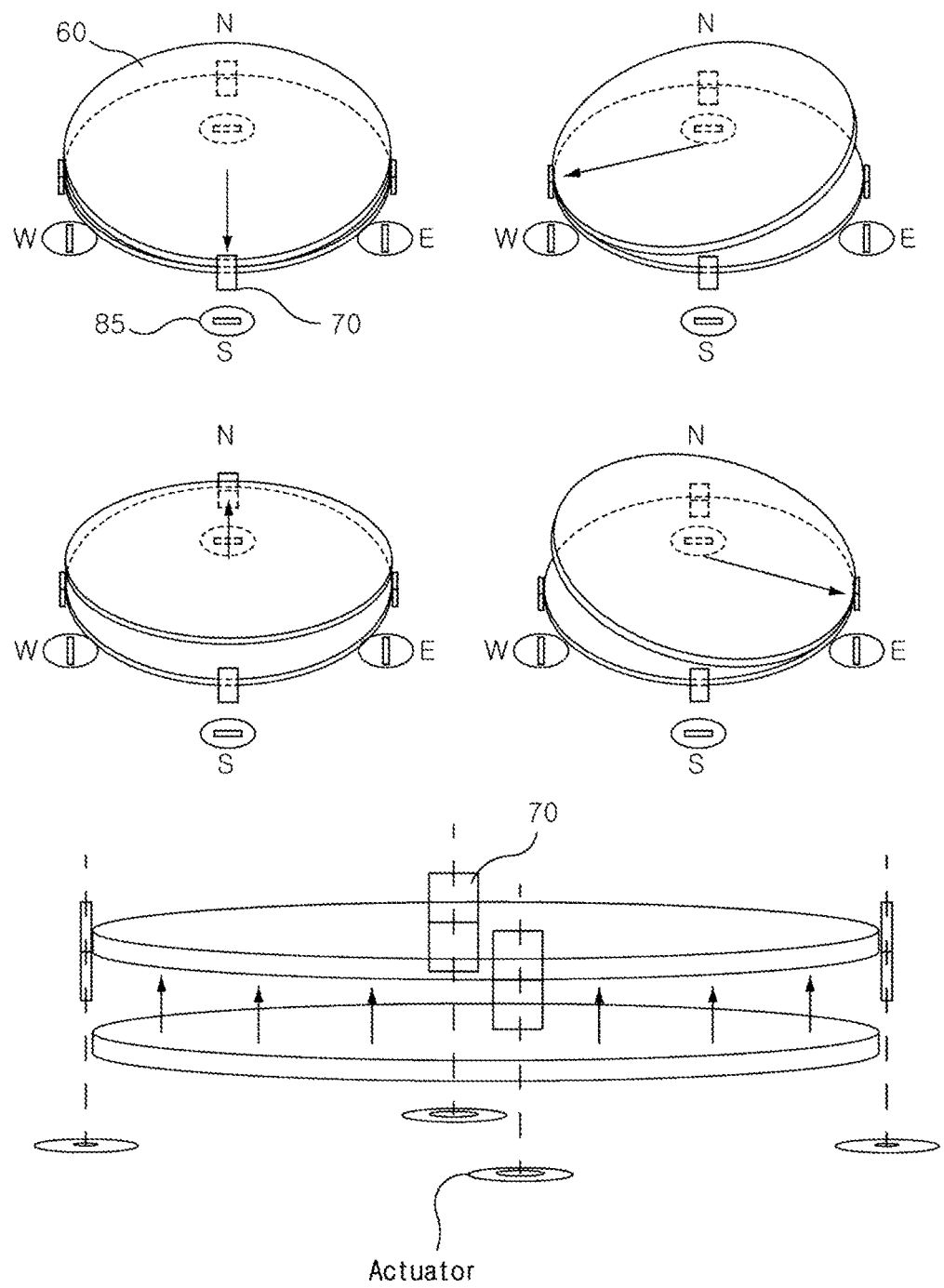
FIG. 4 is a view exemplarily illustrating that a tilt of the camera lens is adjusted at a multi-axial point by a camera lens multi-axial tilt control device according to an embodiment of the present invention.

FIG. 4 is a view exemplarily illustrating that a tilt of a camera lens 80 is adjusted at a multi-axial point by a camera lens multi-axial tilt control device according to an embodiment of the present invention.

Hereinafter, a multi-axial point refers to four axial points in which a pair of magnets 70 and an actuator (VCM) is placed on a straight line, as illustrated in FIG. 4.

As illustrated in FIGS. 3 and 4, a magnet 70 is mounted on each of the four divided axial points of the floating plate 60 on which the assembly of the camera lens 80 is placed, and assuming that a VCM corresponding to an actuator is placed at a lower portion of each magnet 70, when a magnetic field is generated by controlling the direction and strength of the current applied to the VCM located at a specific axial point, the magnet 70 is being pushed or pulled, so that the height of an axial point (in z-axis direction) of a camera lens 80 can be adjusted.

That is, a camera lens multi-axial tilt control device according to an embodiment of the present invention places a magnet 70 at each of three or more axial points of the floating plate 60 spaced apart the same distance from the center of an optical axis direction (z axis) of the camera lens 80, and when the direction and strength of the current applied to the actuator placed on a straight line with each magnet 70 is controlled, the tilt of the camera lens 80 (the tilt of the floating plate) can be adjusted in an optical axis direction at each axial point. As a result, the angle of the camera module can be adjusted in the east E, west W, south S, north N directions, and the like, and when a tilt is simultaneously adjusted for all four axial points, an effect can be obtained that adjustment up to the height for autofocusing.

However, since there is a manufacturing tolerance due to the characteristics of each part (electrical reactivity) and assembly deviation, it is impossible to control the four axial points at the same height without compensating for this.

Accordingly, in the following, the technical conditions necessary in advance to control the four axial points of the camera lens to the same height will be described in detail.

1. The stroke section of the camera lens must be the same at each axial point.

In order to overcome the manufacturing tolerance caused by the characteristics of each part and assembly deviation, first, the stroke section in which the camera lens can move in the axial direction (z-axis) parallel to the optical axis direction at each set axial point must be the same. This means that the movable range at each of the axial points must be limited to a common range. To this end, a common stroke section is found by measuring (using a laser distance meter, LDM) the movable range of the camera lens 80 at each of the four axial points before shipment of the product.

Figure 5:
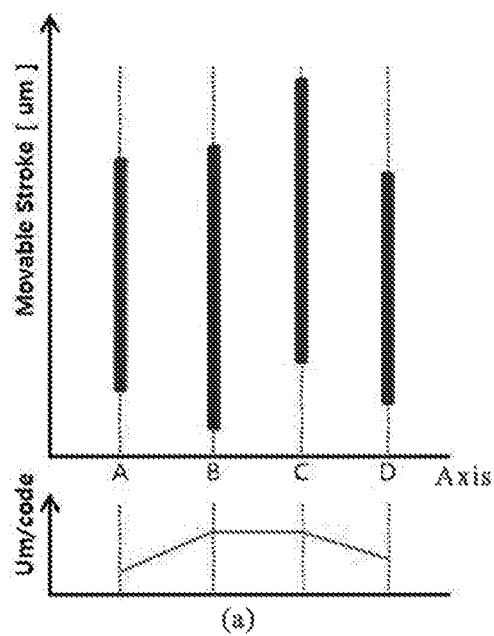
FIG. 5 is a view for explaining a process of equalizing the lens movement distance required for the implementation of the present invention.
Figure 5:
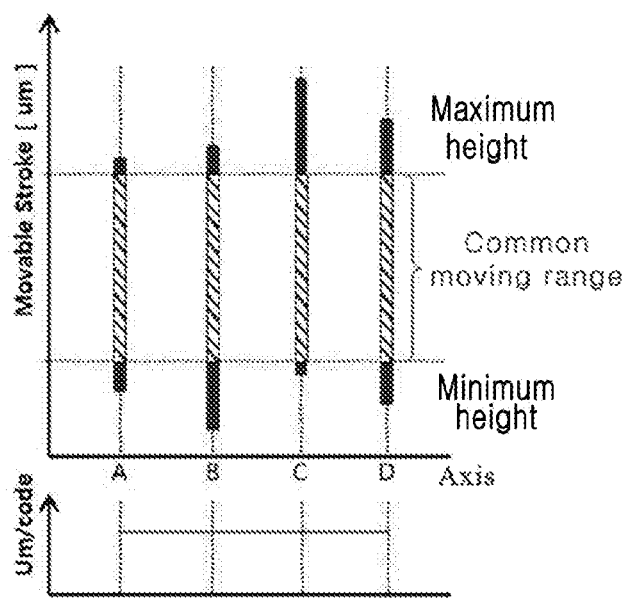

This is further described with reference to FIG. 5, and FIG. 5 is a view for explaining a process of equalizing the lens movement distance required for the implementation of the present invention; (a) shows a stroke section in which the camera lens 80 can be moved from each of the axial points A, B, C, and D, and (b) illustrates a common stroke section.

As illustrated in (a) of FIG. 5, when the stroke section in which the camera lens can be moved against each of the four axial points is measured using LDM, there is a difference in the stroke section movable from each axial point due to manufacturing tolerances. However, as illustrated in (b) of FIG. 5, since there is a stroke section in which the camera lens can be moved in common from each of the four axial points, this is found and limited to a common section that can be moved from each axial point. For example, when the lowest position within the common section is set as an initial position where the camera lens 80 is located, and a servo control algorithm is designed by setting the highest position within the common section as a maximum moveable position, all four heights (z-axis direction) of the axial points of the camera lens 80 can be adjusted only within the common section.

2. Within the common stroke section, the movement distance of a lens for 1 code must be the same.

Even if the movement distance of the lens per control code is designed to be the same, the actual lens movement distance (um/code) for one code appears differently at each axial point as illustrated in (a) of FIG. 5. Therefore, in order to equally control the height of the axial point (z-axis direction) of the camera lens 80 or to tilt it by a specific angle, it is necessary to form a relationship among the components that control the movement of each axial point, so that they respond equally to a same input.

For this, a linear compensation algorithm is needed to compensate for the nonlinearity of the Hall data obtained from the Hall sensor.

Figure 6:
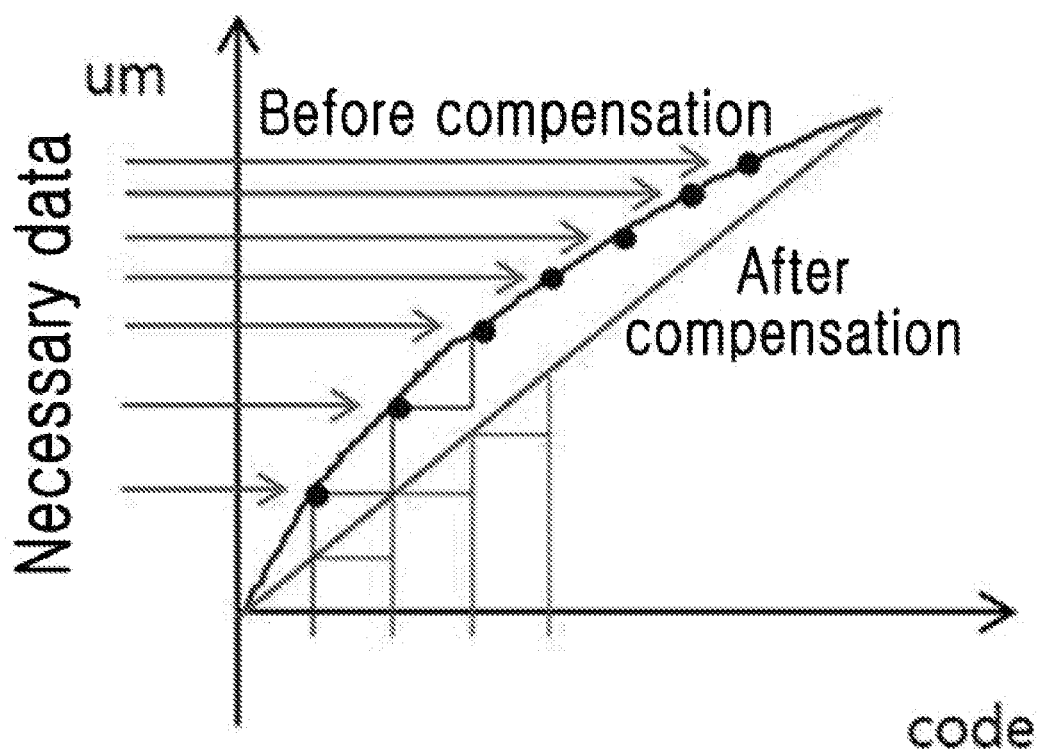
FIG. 6 is a view for explaining a comparison before and after a lens movement distance equalization process.

This is further explained with reference to FIG. 6 is a view for explaining a comparison before (before compensation) and after (after compensation) a lens movement distance equalization process per code, and the movement distance of the lens that is changed according to the control code at each axial point using LDM is measured, a non-linear graph before compensation illustrated in FIG. 6 is obtained. In order to have the same movement distance per control code for this nonlinear graph, the total control code section (e.g., 4096 code) is divided into a certain section (e.g., 8 section), and then if a compensation factor (the inverse function of the measured stroke data's tilt) is calculated and applied to the measured stroke data for each divided section, as illustrated in FIG. 6, a graph after compensation converted to a first-order polynomial can be obtained. When this method is applied to all four axial points, the lens movement distance (μm/code) per control code becomes the same in all axes. Therefore, when the compensation factors obtainable through the linear compensation algorithm for each axis are tabled and used for servo control, the lens movement distance per control code can be made to be the same in all axes.

As described above, a common stroke section is set so that the stroke section of the camera lens becomes to be the same at all axial points, that is, the technical conditions required to control the four axial points of the camera lens to have the same height, and if the compensation factors are tabled and stored in advance so that the lens movement distance for the control code is the same within the common stroke section, and each of the servo control units 110, 210, 310, and 410 controls the camera lens 80 to move in an axial direction (z-axis) parallel to the optical axis direction at each of the axial points, and to move only within a common stroke section, and at the same time, by moving the camera lens 80 to the target position using a compensation factor compensated so that the lens movement distance per control code is the same, and as a result, the four axial points of the camera lens 80 can be controlled to have the same height (maintaining horizontality).

According to means for solving the above technical problems, there is an advantage in that the present invention is not only capable of adjusting the angle of the camera lens in multiple directions by individually controlling the tilt (angle) of the camera lens for each multi-axial point of the camera lens, but also capable of implementing autofocus function by making the movement distance of the lens per control code to be the same for all axial points.

In addition, when the present invention applies currents of different polarities to actuators located at two axial points facing each other on the same axis, since the camera lens 80 can be tilted eventually, there is an advantage of being able to control the angle of roll (θ) and pitch (ϕ) of the lens, as well as implement an anti-shake function.

Figure 7:
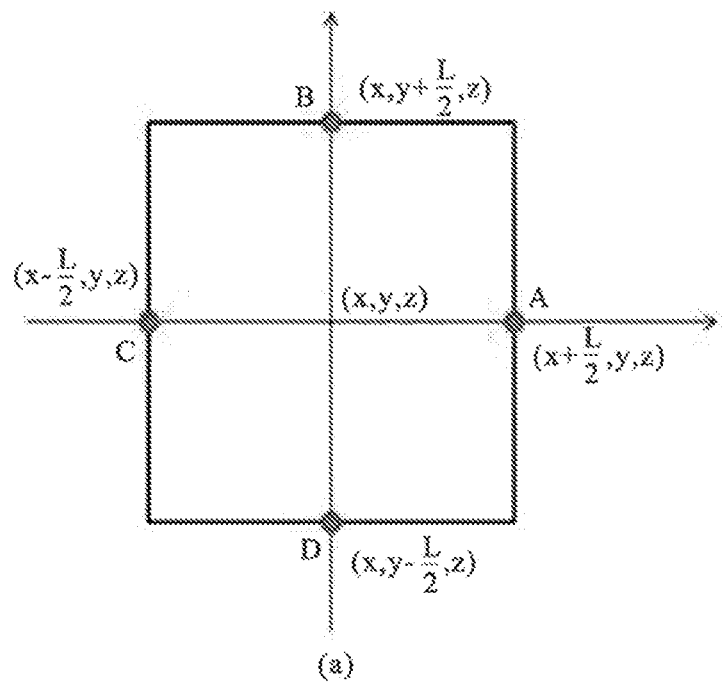
FIG. 7 is a view for explaining a method of calculating a stroke at a multi-axial point of a camera lens according to an embodiment of the present invention.
Figure 7:
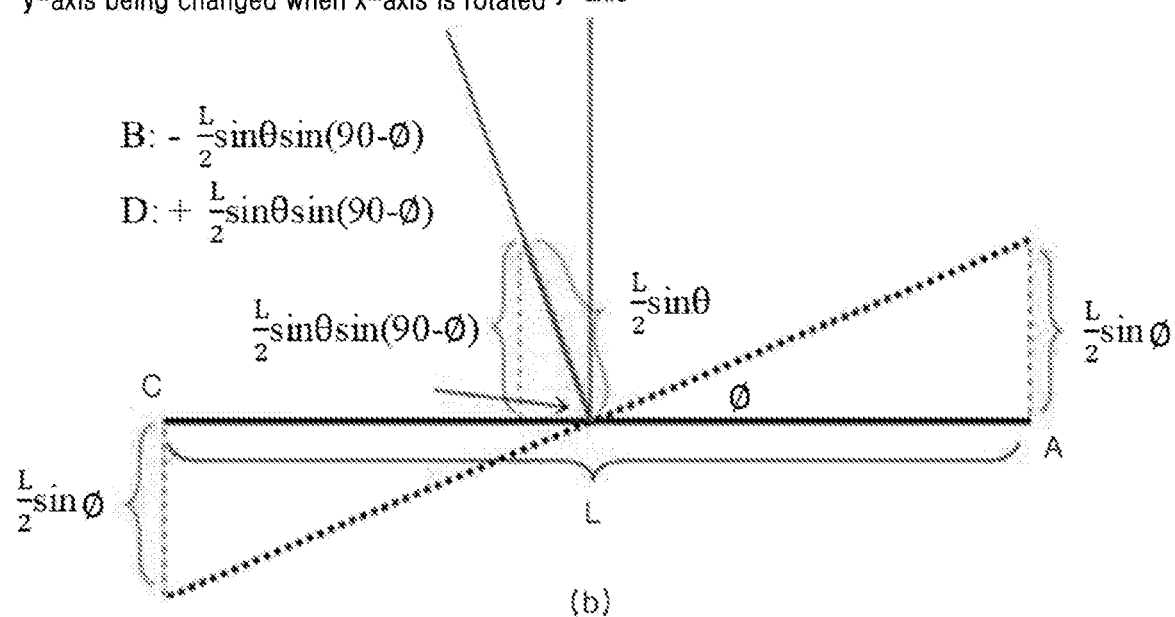

For reference, FIG. 7 is a view for explaining a method of calculating a stroke at a multi-axial point of a camera lens according to an embodiment of the present invention.

First of all, in order to satisfy the two technical conditions described previously, a stroke that can move in the optical axis direction at each axial point of the camera lens 80 should be measured. Since the stroke of an AF camera is usually measured using one LDM, it is necessary to use four LDMs to measure the stroke for four axis points.

To solve this inefficient problem, strokes at multi-axial points can be calculated using one LDM.

A, B, C, and D indicated in (a) of FIG. 7 represent the four axial points described previously. One LDM is used to measure a stroke that is movable in an axial direction parallel to the optical axis at each of these four axial points, and in this case, the LDM is placed in the center of the camera lens 80, as illustrated in (b) of FIG. 7, the stroke before compensation and an x and y-axis tilt at that time. Based on these measurement data, strokes can be calculated for all four axial points. Through geometric analysis, equations to calculate the stroke before compensation of each axial point through the center position and tilt are as follows. In the following equations, it can be assumed that Z is an uncompensated stroke of the lens center, and L is the length of the floating plate 60.

Axis A: $Z+(L/2)*\sin \phi \sin(90-\theta)$

Axis B: $Z-(L/2)*\sin \theta \sin(90-\phi)$

Axis C: $Z-(L/2)*\sin \phi \sin(90-\theta)$

Axis D: $Z+(L/2)*\sin \theta \sin(90-\phi)$

When the stroke at each axis point is calculated using these equations, the lens movement distance per control code can be equally applied on each axis using the linear compensation algorithm described previously.

The above has been described with reference to the embodiments illustrated in the drawings, which are merely exemplary, and those skilled in the art will understand that various modifications and equivalent other embodiments are possible therefrom. For example, in the embodiment of the present invention, it has been described that the height of the camera lens is controlled in the same manner by using four axial points as the axes, but the height of the camera lens may be controlled equally by using three axial points as the axes. Accordingly, the true technical protection scope of the present invention should be defined only by the appended claims.

The invention claimed is:

1. A camera lens multi-axial tilt control device comprising:

Hall sensors for detecting a current position of a camera lens movable in an axial direction parallel to an optical axis direction (z axis) at three or more points spaced apart a same distance from the center of the optical axis direction (z axis) of the camera lens, respectively;

servo control units corresponding to each of the Hall sensors and outputting a servo control signal for moving the camera lens to the target position by comparing the current position of the camera lens being detected by the corresponding Hall sensor with the target position; and actuator driving units corresponding to each of the servo control unit and moving the camera lens to the target position in an axial direction parallel to the optical axis direction at any one of the three or more points according to the servo control signal being outputted from the corresponding servo control unit, characterized in that each of the servo control units controls the movement of the camera lens within a common stroke section among each stroke section in which the camera lens can move in an axial direction (z-axis) parallel to the optical axis direction at each of the three or more points, wherein the camera lens is being moved to a target position using compensation factors obtained through a linear compensation algorithm for each axis compensated so that the lens movement distance per control code is the same.

2. The camera lens multi-axial tilt control device according to claim 1, characterized in that each of the Hall sensors is located on two axes (x-axis and y-axis) orthogonal to the optical axis of the camera lens, and is located at the two axial points facing each other on one axis about the center of the optical axis.

3. The camera lens multi-axial tilt control device according to claim 1, characterized in that the assembly of the camera lens is mounted on a circular floating plate installed to be movable inside the camera module, and the Hall sensor is located so as to face a magnet located at each dividing point (also an axial point) divided into four based on the center point of the floating plate.

4. The camera lens multi-axial tilt control device according to claim 1, characterized in that all of the servo control units are integrated into one chip.

5. A camera lens multi-axial tilt control device comprising:

a circular floating plate on which the camera lens assembly is mounted;

a magnet mounted on the floating plate and mounted at three or more axial points spaced apart a same distance from the center of the optical axis direction (z-axis) of the camera lens;

an actuator located at a lower portion of each of the magnets;

Hall sensors facing each of the magnets and detecting a current position of a camera lens movable in an axial direction (z-axis) parallel to the optical axis direction at each axial point;

servo control units corresponding to each of the Hall sensors and outputting a servo control signal for moving the camera lens to the target position by comparing the current position of the camera lens being detected by the corresponding Hail sensor with the target position; and actuator driving units corresponding to each of the servo control units and moving the camera lens to a target position in an axial direction parallel to the optical axis direction at each axial point according to a servo control signal being outputted from the corresponding servo control unit, characterized in that each of the servo control units controls the movement of the camera lens within a common stroke section among each stroke section in which the camera lens moves in an axial direction (z-axis) parallel to the optical axis direction at each of the three or more points, wherein the camera lens is moved to a target position using a-compensation factors obtained through a linear compensation algorithm for each axis compensated in a way that the lens movement distance per control code is the same.

6. The camera lens multi-axial tilt control device according to claim 5, characterized in that all of the servo control units are integrated into one chip.

7. The camera lens multi-axial tilt control device according to claim 5, characterized in that three or more axial points are equally divided four axial points.

8. A camera lens multi-axial tilt control method of a control unit comprising the steps of:

receiving the current position of the camera lens from a Hall sensor that detects the current position of a camera lens movable in the axial direction (z-axis) parallel to the optical axis direction at each of three or more points spaced apart a same distance from the center of the optical axis direction (z-axis) of the camera lens; and outputting each of the plurality of servo control signals for moving the camera lens to each target position in the axial direction parallel to the optical axis direction by comparing the current position of the camera lens detected at each of the three or more points with the target position, to different actuator driving units, characterized in that each of the plurality of servo control signals is a signal for moving the camera lens within a common stroke section among each stroke section in which the camera lens moves in an axial direction (z-axis) parallel to the optical axis direction at each of the three or more points, and being generated by using compensation factors obtained through a linear compensation algorithm for each axis compensated so that the lens movement distance per control code is the same.

\* \* \* \* \*